United States Patent
Lee (10) Patent No.: US 11,211,797 B2
(45) Date of Patent: Dec. 28, 2021

(54) MICROGRID SYSTEM

(71) Applicant: LSIS CO., LTD., Anyang-si (KR)

(72) Inventor: Yil-Hwa Lee, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 204 days.

(21) Appl. No.: 16/637,429

(22) PCT Filed: May 11, 2018

(86) PCT No.: PCT/KR2018/005441
§ 371 (c)(1),
(2) Date: Feb. 7, 2020

(87) PCT Pub. No.: WO2019/059489
PCT Pub. Date: Mar. 28, 2019

(65) Prior Publication Data
US 2020/0185921 A1   Jun. 11, 2020

(30) Foreign Application Priority Data

Sep. 19, 2017 (KR) .................. 10-2017-0120351

(51) Int. Cl.
*H02J 3/38* (2006.01)
*H02J 3/32* (2006.01)
*H02J 9/06* (2006.01)

(52) U.S. Cl.
CPC .............. *H02J 3/38* (2013.01); *H02J 3/32* (2013.01); *H02J 9/06* (2013.01); *H02J 2203/10* (2020.01)

(58) Field of Classification Search
CPC ........ H02J 3/38; H02J 3/32; H02J 9/06; H02J 2203/10; H02J 3/381; H02J 9/062; H02J 3/06; Y04S 10/12; Y04S 10/14
See application file for complete search history.

(56) References Cited

U.S. PATENT DOCUMENTS

2011/0282507 A1* 11/2011 Oudalov ............... H02H 3/006
                                                      700/292
2014/0116492 A1* 5/2014 Estes .................... H02J 3/40
                                                      136/244

(Continued)

FOREIGN PATENT DOCUMENTS

| JP | 2011142722 A | 7/2011 |
| JP | 2017060380 A | 3/2017 |
| KR | 20160000285 A | 1/2016 |

OTHER PUBLICATIONS

International Search Report for related International Application No. PCT/KR2018/005441; report dated Mar. 28, 2019; (3 pages).

(Continued)

*Primary Examiner* — Ziaul Karim
(74) *Attorney, Agent, or Firm* — K&L Gates LLP (57) ABSTRACT

The present invention pertains to a microgrid system. A microgrid system according to an embodiment of the present invention is a microgrid system that is operated while separated from a power grid, wherein said microgrid system comprises: a first microgrid that includes a first load, a first ESS, a first distributed power system and a first controller; and a second microgrid that includes a second load, a second ESS, a second distributed power system and a second controller, and wherein a line connecting the first and the second microgrid is opened and closed using a relay, and the first and the second controller determine whether to open or close the relay by communicating with one another.

17 Claims, 4 Drawing Sheets

(56) References Cited

U.S. PATENT DOCUMENTS

| | | | |
|---|---|---|---|
| 2014/0156101 A1 | 6/2014 | Miller et al. | |
| 2014/0265573 A1* | 9/2014 | Kreutzman | F24H 1/185 |
| | | | 307/31 |
| 2014/0379156 A1* | 12/2014 | Kamel | G06Q 10/06 |
| | | | 700/291 |
| 2015/0318706 A1* | 11/2015 | Ilinca | H02J 3/14 |
| | | | 700/287 |
| 2017/0194814 A1* | 7/2017 | Chakraborty | H02J 3/381 |
| 2017/0229870 A1* | 8/2017 | Singh | H02J 3/383 |

OTHER PUBLICATIONS

Written Opinion for related International Application No. PCT/KR2018/005441; report dated Mar. 28, 2019; (6 pages).

* cited by examiner

MICROGRID SYSTEM

CROSS-REFERENCE TO RELATED APPLICATIONS

The present application is a National Stage of International Application No. PCT/KR2018/005441, filed on May 11, 2018, which claims the benefit of earlier filing date and right of priority to Korean Application No. 10-2017-0120351, filed on Sep. 19, 2017, the contents of which are all hereby incorporated by reference herein in their entirety.

FIELD OF THE INVENTION

The present disclosure relates to a microgrid system that operates separately from a power system.

BACKGROUND OF THE INVENTION

For most of islands or isolated areas that are not linked to domestic power systems around the world, a standalone microgrid, that is, an off-grid microgrid is constructed to supply electricity thereto.

In this connection, the standalone microgrid refers to a microgrid that is operated independently, that is, in a separated manner from a power system.

For most of the islands or isolated areas, a cost of transporting fuel thereto is high. Thus, there is a problem that a consumer in such isolated areas has to pay a higher cost for the same electricity amount than a consumer in an area linked with the power system has to.

Accordingly, in the island or isolated region, a renewable energy system as an environmentally friendly energy system that does not require the fuel transportation cost and emits no greenhouse gas is used.

However, the renewable energy system has a problem in that stability in power supply is low because variation in an generated power amount is large due to a climatic environment.

Further, when there are many islands or isolated areas, a number of standalone microgrids are built accordingly. Thus, there is a growing need for measures to improve the stability in the power supply.

Accordingly, an approach for increasing the stability and reliability of the power supply via inter-microgrid connection is being considered.

An interconnection network type between microgrids has a distributed structure than a web structure.

In this connection, because there are no specific rule on the number of microgrids as connected with each other, a certain microgrid may be connected to multiple microgrids, but another microgrid may be connected only one microgrid or may not be connected to any microgrid.

Therefore, when considering the connections between the microgrids, it is necessary to consider both communication and power supply therebetween. Thus, when connecting the microgrids with each other, a master-slave connection scheme as shown in FIG. 1 may be used.

Figure 1:
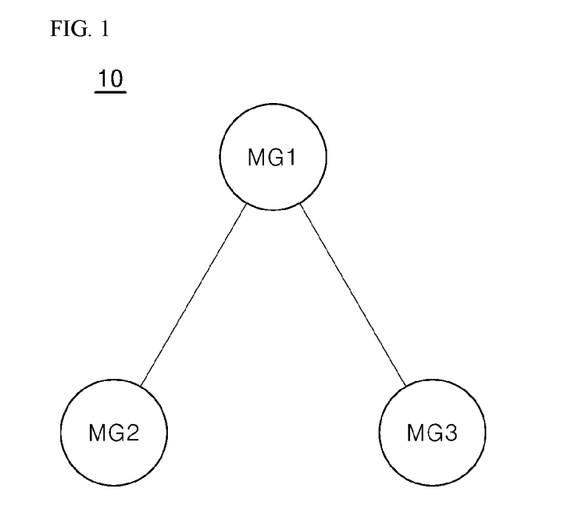
FIG. 1 is a schematic diagram illustrating a microgrid system in which microgrids are connected to each other in a master-slave manner.

FIG. 1 is a schematic diagram illustrating a microgrid system having a master-slave connection scheme.

That is, when there are only a few microgrids MG1 to MG3, a master microgrid (e.g., MG1) and slave microgrids (e.g., MG2 and MG3) are connected to each other to operate as a single microgrid system 10 as shown in FIG. 1.

For reference, the master microgrid MG1 may be authorized to operate the entire microgrid system 10.

However, when there are 100 or 1000 or greater microgrids, a communication load occurs when only the master microgrid operates the entire microgrid system. Control between the microgrids may not be reliable.

Further, a connection network form between the standalone microgrids may has a distributed structure. Thus, unlike the web structure, each microgrid may have no bypass line.

For this reason, a large number of slave microgrids may not be connected to the master microgrid. Thus, there is a limitation in configuring the microgrid system in a master-slave manner.

BRIEF SUMMARY OF THE INVENTION

A purpose of the present disclosure is to provide a microgrid system in which a plurality of standalone microgrids having a distributed structure are connected to each other so that mutual power reception and transmission therebetween may be efficiently performed.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

A first aspect of the present disclosure provides a microgrid system operating separately from a power system, the microgrid system comprising: a first microgrid including a first load, a first energy storage system (ESS) to manage a power supply state to the first load, a first distributed power system to generate power to be supplied to the first load, and a first controller configured to perform a power control operation based on a power state of at least one of the first load, the first ESS, or the first distributed power system; and a second microgrid including a second load, a second energy storage system (ESS) to manage a power supply state to the second load, a second distributed power system to generate power to be supplied to the second load, and a second controller configured to perform a power control operation based on a power state of at least one of the second load, the second ESS, or the second distributed power system, wherein a line connecting the first and second microgrids to each other is brought into a connected or disconnected state via a relay, wherein the first and second controllers are configured to communicate with each other and determine whether to open or close the relay based on the communication result.

In one implementation of the first aspect, when a capacity of the first microgrid is greater than a capacity of the second microgrid, the first controller maintains a power generation mode of the first microgrid to be a constant voltage constant frequency (CVCF) mode, and the second controller maintains a power generation mode of the second microgrid to be a constant output mode.

In one implementation of the first aspect, when the second microgrid is in a power shortage state, the second controller receives power state information of the first microgrid from the first controller, and determines whether to request the first controller to bring the line into the connected state based on the received power state information.

In one implementation of the first aspect, when there is extra power in the first microgrid, the second controller requests the first controller to bring the line into the connected state, the first controller controls the relay to bring the line into the connected state based on the request received from the second controller, and the power from the first microgrid is transferred to the second microgrid through the line in the connected state.

In one implementation of the first aspect, the second ESS includes a battery and a converter to control charging and discharging of the battery, wherein the converter allows the battery to be charged or discharged such that an output power variation per hour of the second distributed power system does not deviate from a preset variation range.

In one implementation of the first aspect, the converter is configured to: when an output power increase per hour of the second distributed power system exceeds an upper limit of the preset variation range, allow the battery to be charged by a power amount by which the output power increase exceeds the upper limit, when an output power decrease per hour of the second distributed power system exceeds the upper limit of the preset variation range, allow the battery to be discharged by a power amount by which the output power decrease exceeds the upper limit.

In one implementation of the first aspect, the first microgrid further includes: an emergency generator controlled by the first controller to supply power to the first load; and a display module for displaying a power state of the first microgrid using one of first to fourth colors, wherein the first controller is configured to determine the power state of the first microgrid based on at least one of a state of charge (SOC) of the battery contained in the first ESS, an output power amount of the first distributed power system, a power consumption of the first load, and an operation state of the emergency generator, wherein the display module receives information about the determined power state of the first microgrid from the first controller and displays one of the first to fourth colors based on the received information about the power state.

In one implementation of the first aspect, the first display module is configured to: when there is extra power in the first microgrid, display the first color, when there is no extra power in the first microgrid, display the second color, when the first microgrid needs to receive power from an outside, display the third color, or when a failure occurs in at least one of the first distributed power system, the first ESS and the emergency generator, display the fourth color.

In one implementation of the first aspect, when the SOC (State of Charge) of the battery included in the first ESS is greater than or equal to a first reference value, and when the output power amount of the first distributed power system is greater than or equal to the power consumption of the first load, the first controller determines that there is extra power in the first microgrid.

In one implementation of the first aspect, the first controller determines that there is no extra power in the first microgrid in one of: a case when the SOC of the battery included in the first ESS is greater than or equal to the first reference value, and the output power amount of the first distributed power system is lower than the power consumption of the first load, a case when the SOC of a battery included in the first ESS is lower than the first reference value and is greater than or equal to a second reference value lower than the first reference value, a case when the SOC of the battery included in the first ESS is lower than the first reference value and the second reference value, and the output power amount of the first distributed power system is greater than or equal to the power consumption of the first load, or a case when the SOC of the battery included in the first ESS is lower than the first reference value and the second reference value, and the output power amount of the first distributed power system is lower than the power consumption of the first load, and the emergency generator operates normally.

In one implementation of the first aspect, the first controller determines that the first microgrid needs to receive the power in one of: a case when the SOC of the battery contained in the first ESS is lower than the first reference value and the second reference value lower than the first reference value, and the output power amount of the first distributed power system is lower than the power consumption of the first load, and the emergency generator fails; or a case when the SOC of the battery included in the first ESS is lower than the first reference value and the second reference value, and the output power amount of the first distributed power system is lower than the power consumption of the first load, and the emergency generator is in a normal state but does not operate.

In one implementation of the first aspect, the first microgrid further includes: a first emergency generator controlled by the first controller to supply power to the first load; and a first display module for displaying a power state of the first microgrid using one of first to fourth colors, wherein the second microgrid further includes: a second emergency generator controlled by the second controller to supply power to the second load; and a second display module for displaying a power state of the second microgrid using one of the first to fourth colors.

A second aspect of the present disclosure provides a microgrid system operating separately from a power system, the microgrid system comprising: a first microgrid including a first load, a first energy storage system (ESS) to manage a power supply state to the first load, a first distributed power system to generate power to be supplied to the first load, and a first controller configured to perform a power control operation based on a power state of at least one of the first load, the first ESS, or the first distributed power system; and a second microgrid including a second load, a second energy storage system (ESS) to manage a power supply state to the second load, a second distributed power system to generate power to be supplied to the second load, and a second controller configured to perform a power control operation based on a power state of at least one of the second load, the second ESS, or the second distributed power system, wherein the first and second microgrids are connected to each other via a first line such that the first and second microgrids receive or transmit power from or to each other, wherein the first and second controllers are configured to communicate with each other and to control the power reception or transmission between the first and second microgrids based on the communication result.

In one implementation of the second aspect, the microgrid system further comprises a third microgrid including a third load, a third energy storage system (ESS) to manage a power supply state to the third load, a third distributed power system to generate power to be supplied to the third load, and a third controller configured to perform a power control operation based on a power state of at least one of the third load, the third ESS, or the third distributed power system, wherein a second line connecting the first and third microgrids to each other is brought into a connected or disconnected state via a first relay, wherein a third line connecting the second and third microgrids to each other is brought into a connected or disconnected state via a second relay, wherein the first and third controllers are configured to communicate with each other and determine whether to open or close the first relay based on the communication result, wherein the second and third controllers are configured to communicate with each other and determine whether to open or close the second relay based on the communication result.

In one implementation of the second aspect, when a capacity of the first microgrid is greater than a capacity of the second microgrid, the first controller maintains a power generation mode of the first microgrid to be a CVCF mode, and the second controller maintains a power generation mode of the second microgrid to be a constant output mode.

In one implementation of the second aspect, when a capacity of the first microgrid is greater than a capacity of the second microgrid, the third microgrid is in a power shortage state, and there is extra power in the first microgrid, the third controller requests the first and second controllers to bring the second and third lines into the connected state respectively, the first and second controllers respectively control the first and second relays based on the request from the third controller to bring the second and third lines into the connected state, respectively, power from the first microgrid is transferred to the third microgrid through at least one of the second and third lines in the connected state.

In one implementation of the second aspect, the first microgrid further includes: a first emergency generator controlled by the first controller to supply power to the first load; and a first display module for displaying a power state of the first microgrid using one of first to fourth colors, wherein the second microgrid further includes: a second emergency generator controlled by the second controller to supply power to the second load; and a second display module for displaying a power state of the second microgrid using one of the first to fourth colors, wherein the third microgrid further includes: a third emergency generator controlled by the third controller to supply power to the third load; and a third display module for displaying a power state of the third microgrid using one of the first to fourth colors.

In accordance with the present disclosure, the plurality of standalone microgrids having a distributed structure are connected to each other so that mutual power reception and transmission therebetween may be efficiently performed. Thus, each standalone microgrid may receive and supply power reliably.

DETAILED DESCRIPTION OF THE INVENTION

The above objects, features and advantages are described in detail below with reference to the accompanying drawings. Accordingly, a person with ordinary knowledge in the technical field to which the present disclosure belongs may easily implement the technical idea of the present disclosure. In describing the present disclosure, detailed descriptions of known components related to the present disclosure will be omitted when it is determined that the descriptions may unnecessarily obscure gist of the present disclosure. Hereinafter, exemplary embodiments of the present disclosure will be described in detail with reference to the accompanying drawings. In the drawings, the same reference numerals are used to indicate the same or similar components.

Hereinafter, a microgrid system according to an embodiment of the present disclosure will be described with reference to FIGS. 2 to 4.

Figure 2:
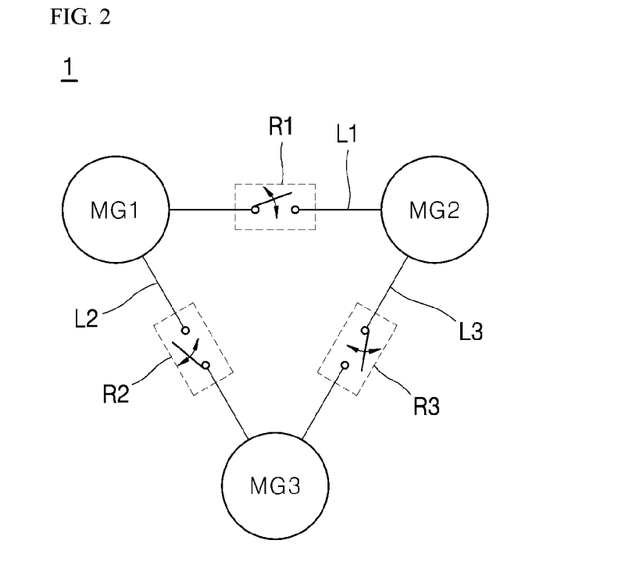
FIG. 2 is a schematic diagram illustrating a microgrid system according to an embodiment of the present disclosure.

FIG. 2 is a schematic diagram illustrating a microgrid system according to an embodiment of the present disclosure. FIG. 3 is a schematic illustrating the microgrid of FIG. 2.

Figure 3:
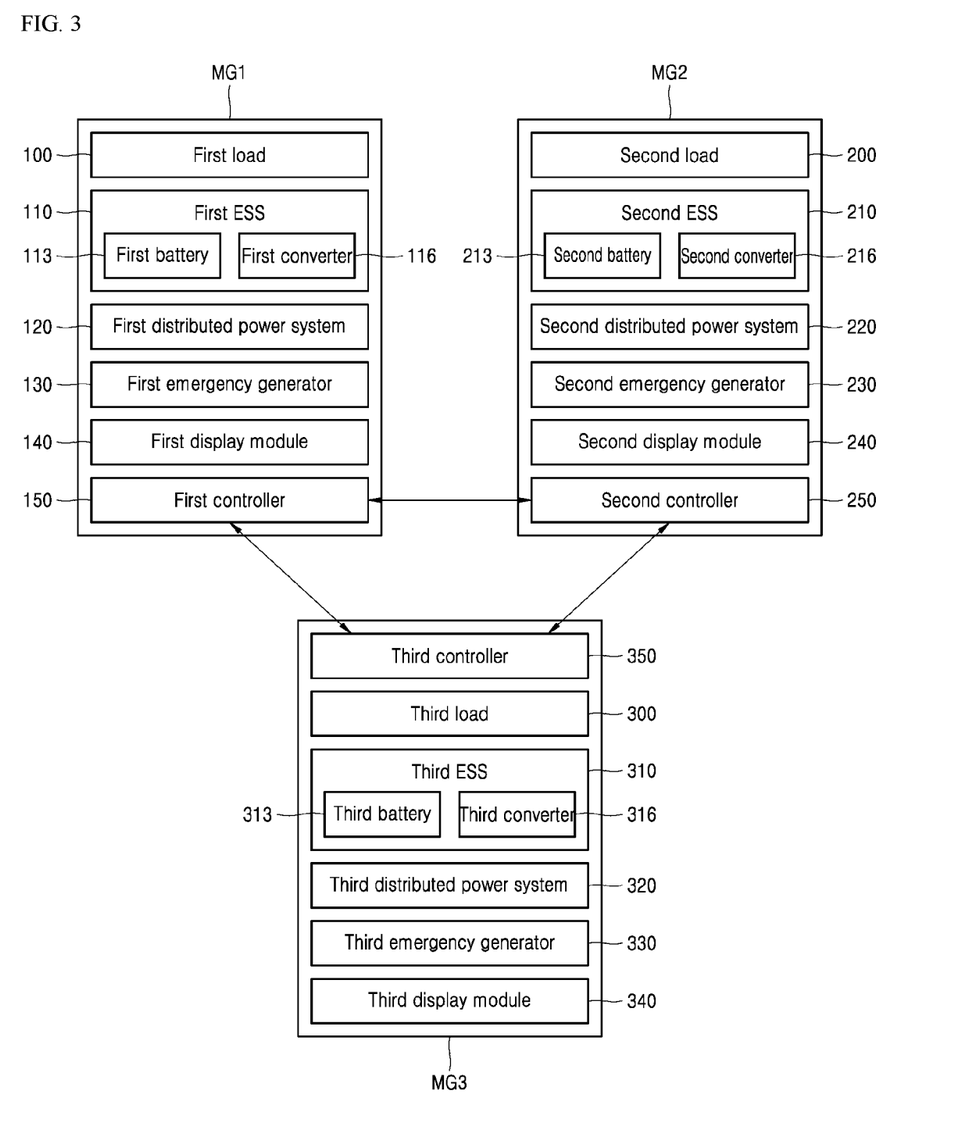
FIG. 3 is a schematic illustrating first to third microgrid of FIG. 2.
Figure 4:
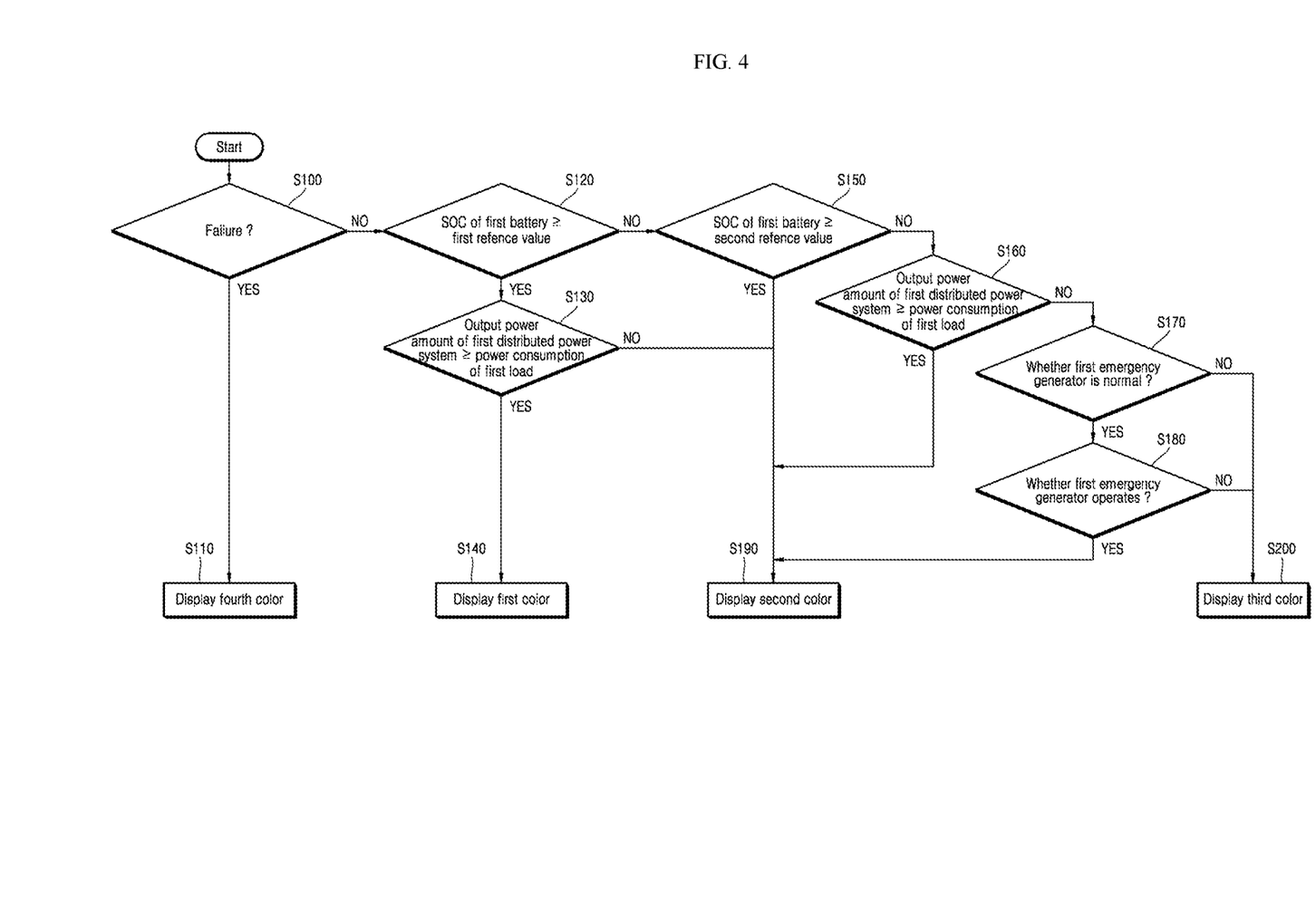
FIG. 4 is a flow chart illustrating a method for determining a power state by a first controller in FIG. 3 and a method for displaying a color by a first display module based on the determination result.

FIG. 4 is a flow chart illustrating a method to determine a power state by a first controller in FIG. 3 and a method to display a color by a first display module based on the determination result.

Referring to FIGS. 2 and 3, a microgrid system 1 according to an embodiment of the present disclosure may include a first microgrid MG1, a second microgrid MG2, and a third microgrid MG3.

In this connection, the microgrid system 1 may be operated independently from a power system (not shown).

Accordingly, each of the microgrids MG1, MG2, and MG3 included in the microgrid system 1 may be a stand-alone microgrid.

For reference, the power system may be a national infrastructure network or a main system such as a power plant, a substation, etc.

Further, the first to third microgrid MG1, MG2 and MG3 may be connected to each other in a plug and play manner, so that they may be operated in a linked manner to each other without additional control engineering.

The first to third microgrids MG1, MG2, and MG3 may be connected to each other via lines that allow them to supply and receive power to and from each other.

That is, the first and second microgrids MG1 and MG2 may be connected to each other via a first line L1. The first and third microgrids MG1 and MG3 may be connected to each other via a second line L2. The second and third microgrids MG2 and MG3 may be connected to each other via a third line L3.

In this connection, the first line L1 may be opened and closed via a first relay R1. The second line L2 may be opened and closed via a second relay R2. The third line L3 may be opened and closed via a third relay R3.

Further, the microgrid system 1 may include a number of microgrids larger or smaller than or equal to 3. In an embodiment of the present disclosure, for convenience of description, the microgrid system 1 includes the three microgrids in an example.

Specifically, the first microgrid MG1 may include a first load 100, a first ESS (energy storage system) 110, a first distributed power system 120, a first emergency generator 130, a first display module 140, and a first controller 150.

In this connection, the first load 100 may include, for example, a home, a large building, a factory, etc. The first load 100 may receive power from the first distributed power system 120, the first ESS 110, or the first emergency generator 130 and may consume the power.

In one example, the first ESS 110 is an energy storage system and may manage a power supply state to the first load 100 and may include a first battery 113, and a first converter 116 for controlling charge and discharge of the first battery 113.

When the first microgrid MG1 operates in a CVCF (Constant Voltage Constant Frequency) mode, the first converter 116 together with the first emergency generator 130 and the first distributed power system 120 may control an output of the first microgrid MG1 to stabilize a voltage and a frequency.

Further, the first converter 116 may smooth an output power of the first distributed power system 120 when the first microgrid MG1 operates in a constant output mode.

That is, the first converter 116 may charge and discharge the first battery such that a output power variation per hour of the first distributed power system 120 does not deviate from a preset variation range (e.g., 0 to 5%).

Accordingly, when an output power increase per hour of the first distributed power system 120 exceeds an upper limit (e.g., 5%) of the preset variation range, the first converter 116 may change the first battery 113 by a power amount by which the increase exceeds the upper limit. When an output power decrease per hour of the first distributed power system 120 exceeds the upper limit (e.g., 5%) of the preset variation range, the first converter 116 may discharge the first battery 113 by a power amount by which the decrease exceeds the upper limit.

The first distributed power system 120 may generate power to be supplied to the first load 100.

Specifically, the first distributed power system 120 may generate power using one or more of fossil fuel, nuclear fuel, and renewable energy.

In particular, when the first microgrid MG1 is a stand-alone microgrid located in an island or isolated area, the first distributed power system 120 may be a renewable power generation system using renewable energy such as a solar power generation system, a wind power generation system, and an tidal power generation system.

The power generated in the first distributed power system 120 may be supplied directly to the first load 100, and may be supplied to the first battery 113 of the first ESS 110.

The first emergency generator 130 may be controlled by the first controller 150 to supply power to the first load 100.

Specifically, when both a charged amount of the first battery 113 and a generated power amount of the first distributed power system 120 are insufficient, the first emergency generator 130 may operate to supply power to the first load 100 or the first battery 113.

For reference, the first emergency generator 130 may include, for example, a diesel generator. However, the present disclosure is not limited thereto.

The first controller 150 may perform a power control operation based on a power state of at least one of the first load 100, the first ESS 110, the first distributed power system 120, and the first emergency generator 130.

For example, when an output power amount of the first distributed power system 120 is greater than a power consumption of the first load 100 in a state where a SOC (State of Charge) of the first battery 113 in the first ESS 110 is 95% or greater, the first controller 150 may cause the output power amount of the first distributed power system 120 to be smaller than the power consumption of the first load 100 or may cause the output power amount of the first distributed power system 120 to be zero.

Further, the first controller 150 may communicate with a second controller 250 and a third controller 350.

Accordingly, the first controller 150 may determine whether to open or close the first relay R1 via communication with the second controller 250 and may determine whether to open or close a second relay R2 via communication with the third controller 350.

In this connection, the first controller 150 may communicate with another controller, for example, in an Ethernet or serial communication manner.

Further, the first controller 150 may determine whether a capacity of the first microgrid MG1 is higher than that of the second microgrid MG2 or third microgrid MG3 via communication with the second and third controllers 250 and 350. Thus, the first controller 150 may determine a generation mode (e.g., the CVCF mode or the constant output mode) of the first microgrid MG1 based on the determination result.

In this connection, the capacity may be determined based on a capacity of at least one of the first distributed power system 120, the first ESS 110, the first emergency generator 130, and the first load 100.

That is, the capacity may be determined based on at least one of a generated power capacity and a load capacity. The capacity may mean a power amount (unit: PW).

Further, the first controller 150 may communicate with at least one of the first distributed power system 120, the first ESS 110, the first load 100, and the first emergency generator 130. In this way, the first controller 150 may share various information (e.g., real-time output power amount information of the first distributed power system 120, SOC information of the first battery 113, power consumption information of the first load 100, information whether the first emergency generator 130 operates, output power amount information of the first emergency generator 130, etc.) with at least one of the first distributed power system 120, the first ESS 110, the first load 100, and the first emergency generator 130.

For reference, the first controller 150 may create a first operation state-related bit value varying according to the generation mode of the first microgrid MG1.

For example, when the generation mode of the first microgrid MG1 is the CVCF mode, the first operation state-related bit value may be '10'. When the generation mode of the first microgrid MG1 is the constant output mode, the first operation state-related bit value may be '01'. When a failure occurs in a power generation operation of the first microgrid MG1, the first operation state-related bit value may be '11'. When a power generation facility (that is, at least one of the first distributed power system 120, the first ESS 110, and the first emergency generator 130) of the first microgrid MG1 has failed, the first operation state-related bit value may be '00'.

In one example, when the first microgrid MG1 operates, for example, in the constant output mode, a constant output value of the first microgrid MG1 may be determined via calculation by the first controller 150 or the first converter 116.

For example, the constant output value of the first microgrid MG1 may be determined based on a following expression:

$$(MG1/2)+(MG1/MGy) \times MG1 (y \text{ is one of 2 and 3}) \quad \text{<Expression>}$$

For reference, MG1 may mean not a rated capacity but an actual capacity value of the first microgrid MG1. MGy may refer to an output value of a microgrid operating in the CVCF mode among the second microgrid MG2 and the third microgrid MG3.

Accordingly, the constant output value of the first microgrid MG1 may continuously change in real time.

In one example, when the first microgrid MG1 is in a power shortage state, the first controller 150 may receive power state information of the second microgrid MG2 from the second controller 250. Then, based on the provided power state information, the first controller 150 may determine whether to request connection of the first line L1 to the second controller 250.

In this connection, when there is extra power in the second microgrid MG2, the first controller 150 may request the connection of the first line L1 to the second controller 250. When the second controller 250 controls the first relay R1 based on the connection request received from the first controller 150 to connect the first line L1, power from the second microgrid MG2 may be transferred to the first microgrid MG1 via the connected first line L1.

Alternatively, the first controller 150 receives power state information of the third microgrid MG3 from the third controller 350. Based on the power state information provided, the first controller 150 may determine whether to request connection of the second line L2 to the third controller 350.

In this connection, when there is extra power in the third microgrid MG3, the first controller 150 may request the third controller 350 to connect the second line L2. When the third controller 350 controls the second relay R2 based on the connection request from the first controller 150 to connect the second line L2, power from the third microgrid MG3 may be transferred to the first microgrid MG1 via the connected second line L2.

Further, the first controller 150 may determine a power state of the first microgrid MG1 based on at least one of a state of charge (SOC) of the first battery 113 included in the first ESS 110, an output power amount of the first distributed power system 120, a power consumption of the first load 100, and an operation state of the first emergency generator 130. The first controller 150 may transmit the determined information about the power state of the first microgrid MG1 to the first display module 140.

For reference, the information about the power state of the first microgrid MG1 may include a second operation state-related bit value.

For example, when there is extra power in the first microgrid MG1, the second operation state-related bit value may be '10'. When there is no extra power in the first microgrid MG1, the second operation state-related bit value may be '01'. When the first microgrid MG1 needs to receive power from an outside (e.g., the second microgrid MG2 or the third microgrid MG3), the second operation state-related bit value may be '11'. When a failure occurs in at least one of the first distributed power system 120, the first ESS 110, and the first emergency generator 130, the second operation state-related bit value may be '00'.

The first display module 140 may display the power state of the first microgrid MG1 using one of first to fourth colors.

Specifically, the first display module 140 receives the information about the power state of the first microgrid MG1 from the first controller 150 and may display one of the first to fourth colors based on the received information about the power state.

For reference, the first display module 140 may display a first color (e.g., green) when there is extra power in the first microgrid MG1. When there is no extra power in the first microgrid MG1, the first display module 140 may display a second color (e.g., yellow). When the first microgrid MG1 needs to receive power from an outside (e.g., the second microgrid MG2 or the third microgrid MG3), the first display module 140 may display a third color (e.g., red). When failure in at least one of the first distributed power system 120, the first ESS 110, and the first emergency generator 130 occurs, a fourth color (e.g., orange) may be displayed by the first display module 140.

Alternatively, the first to fourth colors are not limited to the above colors.

In this connection, reference to FIG. 4, a method to determine the power state of the first controller 150 and a method to display the color by the first display module 140 based on the power state will be described.

For reference, as used herein, the terms 'greater than or equal to' and 'above' may be interchangeable from each other. The terms 'lower than or equal to' and 'below' may be interchangeable from each other.

Referring to FIG. 3 and FIG. 4, first, it is determined whether a failure occurs in S100.

In detail, the first controller 150 may determine whether a failure occurs in at least one of power generation facilities, that is, the first distributed power system 120, the first ESS 110, and the first emergency generator 130.

Further, the first controller 150 may create a '00' as the second operation state-related bit value when the failure occurs in the power generation facility. The corresponding bit value may be provided from the first controller 150 to the first display module 140.

The first display module 140 may display the fourth color (e.g., orange) based on the second operation state-related bit value, that is, '00' provided from the first controller 150 S110.

Subsequently, when the failure does not occur in the power generation facility, the first controller 150 determines whether the SOC of the first battery 113 is equal to or greater than a first reference value S120.

In another example, the first converter 116 rather than the first controller 150 may determine the SOC of the first battery 113 and provide the determination result to the first controller 150.

However, for convenience of description, the present disclosure will describe an example in which the first controller 150 determines the SOC of the first battery 113.

When the SOC of the first battery 113 is equal to or greater than the first reference value (e.g., 80%), the first controller 150 may determine whether the output power amount of the first distributed power system 120 is greater than or equal to the power consumption of the first load 100 S130.

Specifically, when the SOC of the first battery 113 is greater than or equal to the first reference value and when the output power amount of the first distributed power system 120 is greater than or equal to the power consumption of the first load 100, the first controller 150 may create a '10' as the second operation state-related bit value. The corresponding bit value may be provided from the first controller 150 to the first display module 140.

The first display module 140 may display the first color (e.g., green) based on the second operation state-related bit value, that is, '10' provided from the first controller 150 S140.

However, when the SOC of the first battery 113 is greater than or equal to the first reference value, and when the output power amount of the first distributed power system 120 is lower than the power consumption of the first load 100, the first controller 150 may create '01' as the second operation state-related bit value and may provide the corresponding bit value to the first display module 140.

The first display module 140 may display the second color (e.g., yellow) based on the second operation state-related bit value, that is, '01' provided from the first controller 150 S190.

In one example, when the SOC of the first battery 113 is lower than the first reference value, the first controller 150 determines whether the SOC of the first battery 113 is greater than or equal to a second reference value S150.

Specifically, when the SOC of the first battery 113 is greater than or equal to the second reference value and lower than the first reference value, the first controller 150 may create '01' as the second operation state-related bit value. The corresponding bit value may be provided from the first controller 150 to the first display module 140.

The first display module 140 may display the second color (e.g., yellow) as described above based on the second operation state-related bit value, that is, '01' provided from the first controller 150 S190.

For reference, the second reference value (e.g., 30%) may be lower than the first reference value.

Further, when the SOC of the first battery 113 is lower than the second reference value, the first controller 150 determines whether the output power amount of the first distributed power system 120 is greater than or equal to the power consumption of the first load 100 S130.

Specifically, when the SOC of the first battery 113 is lower than the second reference value, and when the output power amount of the first distributed power system 120 is greater than or equal to the power consumption of the first load 100, the first controller 150 may create '01' as the second operation state-related bit value. The corresponding bit value may be provided from the first controller 150 to the first display module 140.

The first display module 140 may display the second color (e.g., yellow) as described above based on the second operation state-related bit value, that is, '01' provided from the first controller 150 S190.

Further, when the SOC of the first battery 113 is lower than the second reference value, and when the output power amount of the first distributed power system 120 is lower than the power consumption of the first load 100, the first controller 150 may determine whether the first emergency generator 130 operates normally S170 and S180.

In detail, when the first emergency generator 130 is in a normal state, that is, has not failed, and operates, the first controller 150 may create '01' as the second operation state-related bit value. The corresponding bit value may be provided from the first controller 150 to the first display module 140.

The first display module 140 may display the second color (e.g., yellow) as described above based on the second operation state-related bit value, that is, '01' provided from the first controller 150 S190.

To the contrary, when the first emergency generator 130 is not in a normal state, or when the first emergency generator 130 is in a normal state but does not operate, the first controller 150 may create '11' as the second operation state-related bit value and provide the corresponding bit value to the first display module 140.

The first display module 140 may display the third color, for example, red, as described above, based on the second operation state-related bit value, that is, '11' as provided from the first controller 150 S200.

For reference, the first controller 150 may create a third operation state-related bit value related to the first battery 113.

For example, the first controller 150 may create '10' as the third operation state-related bit value when the SOC of the first battery 113 is greater than or equal to the first reference value. When the SOC of the first battery 113 is lower than the first reference value and is greater than or equal to the second reference value, the first controller 150 may create '01' as the third operation state-related bit value. When the SOC of the first battery 113 is lower than the second reference value, the first controller 150 may create '11' as the third operation state-related bit value. When a failure occurs in the first battery 113, the first controller 150 may create '00' as the third operation state-related bit value.

The first controller 150 may provide the third operation state-related bit value to the first display module 140. The first display module 140 may separately display a color related to the SOC state of the first battery 113 based on the third operation state-related bit value.

For example, the first display module 140 may display the first color (green) when the third operation state-related bit value is '10'. When '01' is the third operation state-related bit value, the second color (yellow) may be displayed by the first display module 140. When the third operation state-related bit value is '11', the first display module 140 may display the third color (red). When '00' is the third operation state-related bit value, the fourth color (orange) may be displayed by the first display module 140.

In addition, the first controller 150 may separately create a fourth operation state-related bit value related to the first distributed power system 120.

For example, the first controller 150 may create '10' as the fourth operation state-related bit value when the output power amount of the first distributed power system 120 is greater than or equal to the power consumption of the first load 100. When the output power amount of the first distributed power system 120 is lower than the power consumption of the first load 100, the first controller 150 may create '01' as the fourth operation state-related bit value. When the first distributed power system 120 does not output the power, the first controller 150 may create '11' as the fourth operation state-related bit value. When a failure occurs in the first distributed power system 120, the first controller 150 may create '00' as the fourth operation state-related bit value.

The first controller 150 may provide the fourth operation state-related bit value to the first display module 140. The first display module 140 may separately display a color related to the output power amount of the first distributed power system 120 based on the fourth operation state-related bit value.

For example, the first display module 140 may display the first color (green) when the fourth operation state-related bit value is '10'. When '01' is the fourth operation state-related bit value, the first display module 140 may display the second color (yellow). When the fourth operation state-related bit value is '11', the first display module 140 may display the third color (red). When '00' is the fourth operation state-related bit value, the fourth color (orange) may be displayed by the first display module 140.

As described above, the first microgrid MG1 may be a standalone microgrid and may be connected to the second and third microgrids MG2 and MG3 as the standalone microgrid located adjacent thereto. Thus, the first microgrid MG1 may receive or supply the power from or to the second and third microgrids MG2 and MG3 in an emergency state.

Further, the second microgrid MG2 may include a second load 200, a second ESS 210, a second distributed power system 220, a second emergency generator 230, a second display module 240, and the second controller 250. The third microgrid MG3 may include a third load 300, a third ESS 310, a third distributed power system 320, a third emergency generator 330, a third display module 340, and the third controller 350.

However, since each of the second microgrid MG2 and the third microgrid MG3 has the same configuration and function as those of the first microgrid MG1, detailed descriptions thereof will be omitted.

As described above, according to the microgrid system 1 according to an embodiment of the present disclosure, the plurality of standalone microgrids MG1 to MG3 having a distributed structure may be connected to each other so that mutual power reception and transmission therebetween may be efficiently performed. Thus, each standalone microgrid may receive and supply power reliably.

Hereinafter, a microgrid system according to another embodiment of the present disclosure will be described with reference to FIG. 5.

Figure 5:
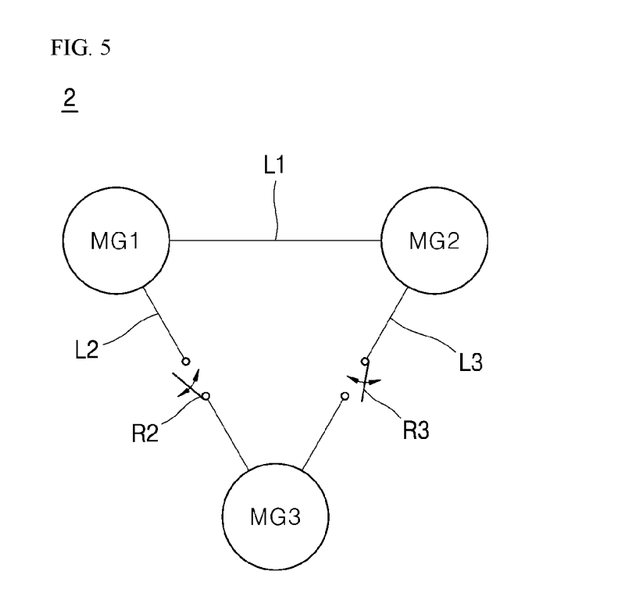
FIG. 5 is a schematic diagram illustrating a microgrid system according to another embodiment of the present disclosure.

However, the microgrid system 2 of FIG. 5 is identical to the microgrid system 1 of FIG. 2 except for some configurations and effects.

First, referring to FIG. 5, the microgrid system 2 according to another embodiment of the present disclosure may include the first to third microgrids MG1 to MG3.

Specifically, the first and second microgrids MG1 and MG2 may be connected to each other via the first line L1. The first and third microgrids MG1 and MG3 may be connected to each other via the second line L2. The second and third microgrids MG2 and MG3 may be connected to each other via the third line L3.

In this connection, the first line L1 may be always in a connected state, while the second line L2 may be opened (disconnected) or closed (connected) via the second relay R2, and the third line L3 may be opened and closed via the third relay R3.

Accordingly, the first microgrid MG1 may receive or transmit the power from or to the second microgrid MG2 at all times. The third microgrid MG3 may execute a connection request to at least one of the first microgrid MG1 and the second microgrid MG2 when the third microgrid MG3 is in a power shortage state.

Specifically, for example, it may be assumed that a capacity of the first microgrid MG1 is greater than a capacity of the second microgrid MG2, and the third microgrid MG3 is in the power shortage state, and the first microgrid MG1 has extra power. In this case, the first microgrid MG1 may operate in the CVCF mode, while the second microgrid may operate in the constant output mode.

Further, the third microgrid MG3 may request connections (closed states) of the second and third lines L2 and L3 to the first and second microgrids MG1 and MG2, respectively. The first and second microgrids MG1 and MG2 may control the second and third relays R2 and R3 based on the connection requests provided from the third microgrid MG3, respectively, to connect the second and third lines L2 and L3, respectively.

When the second and third lines L2 and L3 are brought into the connected state, the power of the first microgrid MG1 may be transmitted to the third microgrid MG3 via at least one of the second and third lines L2 and L3.

That is, the power of the first microgrid MG1 may be transferred directly to the third microgrid MG3 through the second line L2. Alternatively, the power of the second microgrid MG2 may be first transferred through the third line L3 to the third microgrid MG3 and then the power of the first microgrid MG1 may be supplied to the second microgrid MG2 to compensate for a power shortage amount of the second microgrid MG2.

Further, a portion of the power of the first microgrid MG1 may be transferred to the third microgrid MG3 via the second line L2. A portion of the power of the second microgrid MG2 may be transferred to the third microgrid MG3 via the third line L3.

In this connection, alternatively, When a power shortage occurs in the second microgrid MG2, the power of the first microgrid MG1 may be supplied to the second microgrid MG2 to compensate for the corresponding shortage amount.

As described above, according to the microgrid system 1 according to another embodiment of the present disclosure, the constant connection scheme between some microgrids may be established while an emergency connection scheme between remaining microgrids may be configured so that mutual power reception and transmission therebetween may be efficiently performed. Thus, each standalone microgrid may receive and supply power reliably.

The present disclosure as described above may be subjected to various substitutions, modifications, and changes by those skilled in the art to which the present disclosure belongs without departing from the technical spirit of the present disclosure. Thus, the scope of the present disclosure is not limited to the above embodiments and the accompanying drawings.

What is claimed is:

1. A microgrid system operating separately from a power system, the microgrid system comprising:
a first microgrid including a first load, a first energy storage system (ESS) to manage a power supply state to the first load, a first distributed power system to generate power to be supplied to the first load, and a first controller configured to perform a power control operation based on a power state of at least one of the first load, the first ESS, or the first distributed power system; and
a second microgrid including a second load, a second energy storage system (ESS) to manage a power supply state to the second load, a second distributed power system to generate power to be supplied to the second load, and a second controller configured to perform a power control operation based on a power state of at least one of the second load, the second ESS, or the second distributed power system,
wherein a line connecting the first and second microgrids to each other is brought into a connected or disconnected state via a relay,
wherein the first and second controllers are configured to communicate with each other and determine whether to open or close the relay based on the communication result.

2. The microgrid system of claim 1, wherein when a capacity of the first microgrid is greater than a capacity of the second microgrid,
the first controller maintains a power generation mode of the first microgrid to be a constant voltage constant frequency (CVCF) mode, and the second controller maintains a power generation mode of the second microgrid to be a constant output mode.

3. The microgrid system of claim 2, wherein when the second microgrid is in a power shortage state,
the second controller receives power state information of the first microgrid from the first controller, and determines whether to request the first controller to bring the line into the connected state based on the received power state information.

4. The microgrid system of claim 3, wherein when there is extra power in the first microgrid,
the second controller requests the first controller to bring the line into the connected state,
the first controller controls the relay to bring the line into the connected state based on the request received from the second controller, and
the power from the first microgrid is transferred to the second microgrid through the line in the connected state.

5. The microgrid system of claim 2, wherein the second ESS includes a battery and a converter to control charging and discharging of the battery,
wherein the converter allows the battery to be charged or discharged such that an output power variation per hour of the second distributed power system does not deviate from a preset variation range.

6. The microgrid system of claim 5, wherein the converter is configured to:
when an output power increase per hour of the second distributed power system exceeds an upper limit of the preset variation range, allow the battery to be charged by a power amount by which the output power increase exceeds the upper limit,
when an output power decrease per hour of the second distributed power system exceeds the upper limit of the preset variation range, allow the battery to be discharged by a power amount by which the output power decrease exceeds the upper limit.

7. The microgrid system of claim 1, wherein the first microgrid further includes:
an emergency generator controlled by the first controller to supply power to the first load; and
a display module for displaying a power state of the first microgrid using one of first to fourth colors,
wherein the first controller is configured to determine the power state of the first microgrid based on at least one of a state of charge (SOC) of the battery contained in the first ESS, an output power amount of the first distributed power system, a power consumption of the first load, and an operation state of the emergency generator,
wherein the display module receives information about the determined power state of the first microgrid from the first controller and displays one of the first to fourth colors based on the received information about the power state.

8. The microgrid system of claim 7, wherein the first display module is configured to:
when there is extra power in the first microgrid, display the first color,
when there is no extra power in the first microgrid, display the second color,
when the first microgrid needs to receive power from an outside, display the third color, or
when a failure occurs in at least one of the first distributed power system, the first ESS and the emergency generator, display the fourth color.

9. The microgrid system of claim 7, wherein when the SOC (State of Charge) of the battery included in the first ESS is greater than or equal to a first reference value, and when the output power amount of the first distributed power system is greater than or equal to the power consumption of the first load, the first controller determines that there is extra power in the first microgrid.

10. The microgrid system of claim 9, wherein the first controller determines that there is no extra power in the first microgrid in one of:
a case when the SOC of the battery included in the first ESS is greater than or equal to the first reference value, and the output power amount of the first distributed power system is lower than the power consumption of the first load,
a case when the SOC of a battery included in the first ESS is lower than the first reference value and is greater than or equal to a second reference value lower than the first reference value,
a case when the SOC of the battery included in the first ESS is lower than the first reference value and the second reference value, and the output power amount of the first distributed power system is greater than or equal to the power consumption of the first load, or
a case when the SOC of the battery included in the first ESS is lower than the first reference value and the second reference value, and the output power amount of the first distributed power system is lower than the power consumption of the first load, and the emergency generator operates normally.

11. The microgrid system of claim 10, wherein the first controller determines that the first microgrid needs to receive the power in one of:
a case when the SOC of the battery contained in the first ESS is lower than the first reference value and the second reference value lower than the first reference value, and the output power amount of the first distributed power system is lower than the power consumption of the first load, and the emergency generator fails; or
a case when the SOC of the battery included in the first ESS is lower than the first reference value and the second reference value, and the output power amount of the first distributed power system is lower than the power consumption of the first load, and the emergency generator is in a normal state but does not operate.

12. The microgrid system of claim 1, wherein the first microgrid further includes:
a first emergency generator controlled by the first controller to supply power to the first load; and
a first display module for displaying a power state of the first microgrid using one of first to fourth colors,
wherein the second microgrid further includes:
a second emergency generator controlled by the second controller to supply power to the second load; and
a second display module for displaying a power state of the second microgrid using one of the first to fourth colors.

13. A microgrid system operating separately from a power system, the microgrid system comprising:
a first microgrid including a first load, a first energy storage system (ESS) to manage a power supply state to the first load, a first distributed power system to generate power to be supplied to the first load, and a first controller configured to perform a power control operation based on a power state of at least one of the first load, the first ESS, or the first distributed power system; and
a second microgrid including a second load, a second energy storage system (ESS) to manage a power supply state to the second load, a second distributed power system to generate power to be supplied to the second load, and a second controller configured to perform a power control operation based on a power state of at least one of the second load, the second ESS, or the second distributed power system, wherein the first and second microgrids are connected to each other via a first line such that the first and second microgrids receive or transmit power from or to each other, wherein the first and second controllers are configured to communicate with each other and to control the power reception or transmission between the first and second microgrids based on the communication result.

14. The microgrid system of claim 13, wherein the microgrid system further comprises a third microgrid including a third load, a third energy storage system (ESS) to manage a power supply state to the third load, a third distributed power system to generate power to be supplied to the third load, and a third controller configured to perform a power control operation based on a power state of at least one of the third load, the third ESS, or the third distributed power system, wherein a second line connecting the first and third microgrids to each other is brought into a connected or disconnected state via a first relay, wherein a third line connecting the second and third microgrids to each other is brought into a connected or disconnected state via a second relay, wherein the first and third controllers are configured to communicate with each other and determine whether to open or close the first relay based on the communication result, wherein the second and third controllers are configured to communicate with each other and determine whether to open or close the second relay based on the communication result.

15. The microgrid system of claim 14, wherein when a capacity of the first microgrid is greater than a capacity of the second microgrid, the first controller maintains a power generation mode of the first microgrid to be a CVCF mode, and the second controller maintains a power generation mode of the second microgrid to be a constant output mode.

16. The microgrid system of claim 14, wherein when a capacity of the first microgrid is greater than a capacity of the second microgrid, the third microgrid is in a power shortage state, and there is extra power in the first microgrid, the third controller requests the first and second controllers to bring the second and third lines into the connected state respectively, the first and second controllers respectively control the first and second relays based on the request from the third controller to bring the second and third lines into the connected state, respectively, power from the first microgrid is transferred to the third microgrid through at least one of the second and third lines in the connected state.

17. The microgrid system of claim 14, wherein the first microgrid further includes:

a first emergency generator controlled by the first controller to supply power to the first load; and a first display module for displaying a power state of the first microgrid using one of first to fourth colors, wherein the second microgrid further includes:

a second emergency generator controlled by the second controller to supply power to the second load; and a second display module for displaying a power state of the second microgrid using one of the first to fourth colors, wherein the third microgrid further includes:

a third emergency generator controlled by the third controller to supply power to the third load; and a third display module for displaying a power state of the third microgrid using one of the first to fourth colors.

* * * * *